US008819611B2

(12) United States Patent
Philip et al.

(10) Patent No.: US 8,819,611 B2
(45) Date of Patent: Aug. 26, 2014

(54) ASYMMETRIC MESH NOC TOPOLOGIES

(71) Applicant: NetSpeed Systems, San Jose, CA (US)

(72) Inventors: Joji Philip, San Jose, CA (US); Sailesh Kumar, San Jose, CA (US); Eric Norige, East Lansing, MI (US); Mahmud Hassan, San Carlos, CA (US); Sundari Mitra, Saratoga, CA (US)

(73) Assignee: NetSpeed Systems, San Jose, CA (US)

( * ) Notice: Subject to any disclaimer, the term of this patent is extended or adjusted under 35 U.S.C. 154(b) by 0 days.

(21) Appl. No.: 14/027,651

(22) Filed: Sep. 16, 2013

(65) Prior Publication Data

US 2014/0115218 A1    Apr. 24, 2014

Related U.S. Application Data

(62) Division of application No. 13/658,663, filed on Oct. 23, 2012, now Pat. No. 8,601,423.

(51) Int. Cl.
*G06F 17/50*    (2006.01)
*G06F 13/40*    (2006.01)
*G06F 15/78*    (2006.01)

(52) U.S. Cl.
CPC ........ *G06F 17/5077* (2013.01); *G06F 2217/66* (2013.01); *G06F 17/5054* (2013.01); *G06F 13/40* (2013.01); *G06F 15/7825* (2013.01); *G06F 17/5027* (2013.01); *G06F 17/5072* (2013.01); *G06F 2217/40* (2013.01)
USPC ........... 716/131; 716/129; 716/130; 716/122; 716/123; 716/124; 703/16

(58) Field of Classification Search
CPC ............ G06F 2217/66; G06F 2217/40; G06F 17/5054; G06F 17/5027; G06F 13/40; G06F 15/7825; G06F 17/5077; G06F 17/5072

USPC ................. 716/131, 129, 130, 122, 123, 124; 703/16
See application file for complete search history.

(56) References Cited

U.S. PATENT DOCUMENTS 5,432,785 A    7/1995  Ahmed et al.
5,764,740 A    6/1998  Holender
(Continued)

FOREIGN PATENT DOCUMENTS

CN    103684961 A    3/2014
WO    2014059024 A1    4/2014

OTHER PUBLICATIONS

U.S. Appl. No. 13/658,663—related matter.
(Continued)

*Primary Examiner* — Phallaka Kik
(74) *Attorney, Agent, or Firm* — Procopio, Cory, Hargreaves & Savitch LLP

(57) ABSTRACT

Example implementations described herein are directed to a floor plan for a Network on Chip (NoC) topology that can include a plurality of on chip blocks of substantially non-uniform shapes and dimensions. An interconnection network is synthesized along with a plan for a physical layout of the interconnection network based on physical dimensions of the plurality of on chip blocks, the physical dimensions of the floorplan and relative placement information for placing the plurality of on chip blocks on the floorplan. Porosity information for the plurality of on chip blocks on the floorplan and required chip functionality may also be taken into consideration.

12 Claims, 13 Drawing Sheets

(56) References Cited

U.S. PATENT DOCUMENTS

| | | | |
|---|---|---|---|
| 5,991,308 A | | 11/1999 | Fuhrmann et al. |
| 6,003,029 A | | 12/1999 | Agrawal et al. |
| 6,249,902 B1 | * | 6/2001 | Igusa et al. .................... 716/123 |
| 6,415,282 B1 | | 7/2002 | Mukherjea et al. |
| 6,925,627 B1 | | 8/2005 | Longway et al. |
| 7,065,730 B2 | * | 6/2006 | Alpert et al. .................. 716/114 |
| 7,318,214 B1 | | 1/2008 | Prasad et al. |
| 7,590,959 B2 | | 9/2009 | Tanaka |
| 7,725,859 B1 | | 5/2010 | Lenahan et al. |
| 7,808,968 B1 | | 10/2010 | Kalmanek, Jr. et al. |
| 7,917,885 B2 | * | 3/2011 | Becker .......................... 716/137 |
| 8,050,256 B1 | | 11/2011 | Bao et al. |
| 8,059,551 B2 | | 11/2011 | Milliken |
| 8,099,757 B2 | | 1/2012 | Riedle et al. |
| 8,136,071 B2 | | 3/2012 | Solomon |
| 8,281,297 B2 | * | 10/2012 | Dasu et al. .................... 717/161 |
| 8,312,402 B1 | | 11/2012 | Okhmatovski et al. |
| 8,448,102 B2 | * | 5/2013 | Kornachuk et al. ............. 716/55 |
| 8,492,886 B2 | | 7/2013 | Or-Bach et al. |
| 8,541,819 B1 | | 9/2013 | Or-Bach et al. |
| 8,543,964 B2 | | 9/2013 | Ge et al. |
| 8,601,423 B1 | | 12/2013 | Philip et al. |
| 8,635,577 B2 | * | 1/2014 | Kazda et al. ................... 716/130 |
| 8,667,439 B1 | | 3/2014 | Kumar et al. |
| 8,717,875 B2 | | 5/2014 | Bejerano et al. |
| 2002/0071392 A1 | | 6/2002 | Grover et al. |
| 2002/0073380 A1 | | 6/2002 | Cooke et al. |
| 2002/0095430 A1 | * | 7/2002 | Egilsson et al. ........... 707/104.1 |
| 2004/0216072 A1 | * | 10/2004 | Alpert et al. .................... 716/13 |
| 2005/0147081 A1 | | 7/2005 | Acharya et al. |
| 2006/0161875 A1 | | 7/2006 | Rhee |
| 2007/0118320 A1 | | 5/2007 | Luo et al. |
| 2007/0244676 A1 | | 10/2007 | Shang et al. |
| 2007/0256044 A1 | | 11/2007 | Coryer et al. |
| 2007/0267680 A1 | | 11/2007 | Uchino et al. |
| 2008/0072182 A1 | * | 3/2008 | He et al. ............................ 716/2 |
| 2008/0120129 A1 | | 5/2008 | Seubert et al. |
| 2009/0070726 A1 | | 3/2009 | Mehrotra et al. |
| 2009/0268677 A1 | | 10/2009 | Chou et al. |
| 2009/0313592 A1 | | 12/2009 | Murali et al. |
| 2010/0040162 A1 | | 2/2010 | Suehiro |
| 2011/0035523 A1 | | 2/2011 | Feero et al. |
| 2011/0060831 A1 | | 3/2011 | Ishii et al. |
| 2011/0072407 A1 | | 3/2011 | Keinert et al. |
| 2011/0154282 A1 | | 6/2011 | Chang et al. |
| 2011/0276937 A1 | | 11/2011 | Waller |
| 2012/0022841 A1 | | 1/2012 | Appleyard |
| 2012/0023473 A1 | | 1/2012 | Brown et al. |
| 2012/0026917 A1 | | 2/2012 | Guo et al. |
| 2012/0110541 A1 | | 5/2012 | Ge et al. |
| 2012/0155250 A1 | | 6/2012 | Carney et al. |
| 2013/0051397 A1 | | 2/2013 | Guo et al. |
| 2013/0080073 A1 | | 3/2013 | de Corral |
| 2013/0103369 A1 | | 4/2013 | Huynh et al. |
| 2013/0151215 A1 | | 6/2013 | Mustapha |
| 2013/0159944 A1 | | 6/2013 | Uno et al. |
| 2013/0174113 A1 | * | 7/2013 | Lecler et al. ................... 716/122 |
| 2013/0207801 A1 | | 8/2013 | Barnes |
| 2013/0219148 A1 | | 8/2013 | Chen et al. |
| 2013/0263068 A1 | * | 10/2013 | Cho et al. ....................... 716/104 |
| 2013/0326458 A1 | * | 12/2013 | Kazda et al. ................... 716/129 |
| 2014/0068132 A1 | | 3/2014 | Philip et al. |
| 2014/0092740 A1 | | 4/2014 | Wang et al. |
| 2014/0098683 A1 | | 4/2014 | Kumar et al. |
| 2014/0115298 A1 | | 4/2014 | Philip et al. |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, F, et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

RELATED ART

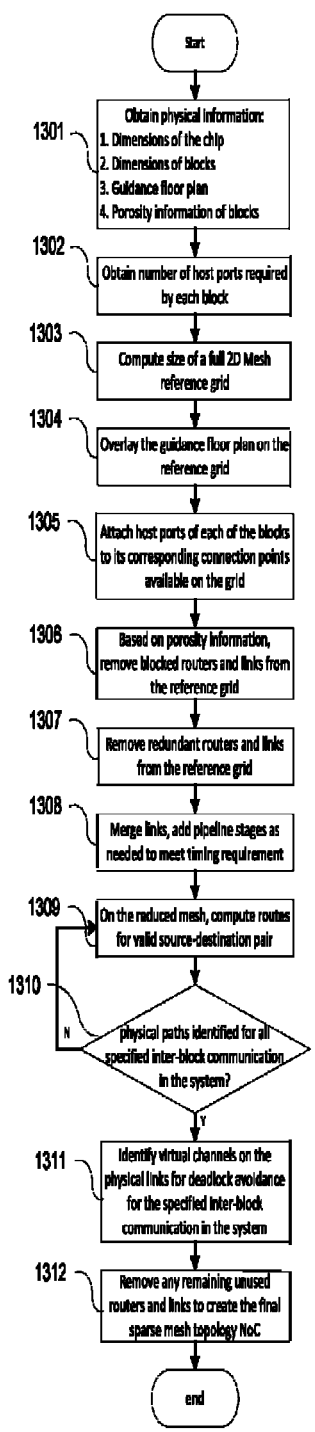

ASYMMETRIC MESH NOC TOPOLOGIES

CROSS-REFERENCE TO RELATED APPLICATION(S)

This application claims the benefit of U.S. application Ser. No. 13/658,663, filed Oct. 23, 2012, the disclosure of which is hereby incorporated by reference.

BACKGROUND

1. Technical Field

Methods and example embodiments described herein are generally directed to interconnect architecture, and more specifically, to network-on-chip system interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems, the on-chip interconnect plays a key role in providing high-performance communication between the various components.

Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links. Messages are injected by the source and are routed from the source node to the destination over multiple intermediate nodes and physical links. The destination node then ejects the message and provides it to the destination. For the remainder of the document, terms 'components', 'blocks' hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as 'multi-core system'.

There are several possible topologies in which the routers can connect to one another to create the system network. Bi-directional rings (as illustrated in FIG. 1(a)) and 2-D mesh (as illustrated in FIG. 1(b)) are examples of topologies in the related art.

As illustrated in FIG. 2 a full 2D mesh is comprised of a grid structure, with a router at each cross point of the grid. The grid has a specific number of routers on X and Y axes. This defines the size of the network, 5×5 being the size in this example. Each router is identified on the grid using its XY co-ordinate. In the figure, origin is at upper left corner of the grid and each router depicts its ID or XY co-ordinate. Each router on the grid has four direction ports and on each of these ports the router can transmit and receive messages over the interconnect wires which form point to point link between the router and the next router along the port. Each router also has one or more host ports through which it connects to host blocks using point-to-point links. The host blocks receives and/or transmits messages from and/or to the network through the host ports.

Packets are message transport units for intercommunication between various components. Routing involves identifying a path which is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is oblivious of the state of the network and does not load balance across path diversities which might exist in the underlying network. However, deterministic routing is simple to implement in hardware, maintains packet ordering and easy to make free of network level deadlocks. Shortest path routing minimizes the latency as it reduces the number of hops from the source to destination. For this reason, the shortest path is also the lowest power path for communication between the two components. Dimension order routing is a form of deterministic shortest path routing in two-dimensional (2D) mesh networks. Adaptive routing can dynamically change the path taken between two points on the network based on the state of the network. This form of routing may be complex to analyze for deadlocks and have complexities associated with maintaining packet ordering. Because of these implementation challenges, adaptive routing is rarely used in practice.

FIG. 2 illustrates an example of dimension order routing in a two dimensional mesh. More specifically, FIG. 2 illustrates XY routing from node '34' to node '00'. In the example of FIG. 2, each component is connected to only one port of one router. A packet is first routed in the X dimension (−X or West direction in this case) until it reaches node '04' where the X co-ordinate is the same as destination's X co-ordinate. The packet is next routed in the Y (+Y or North direction in this case) dimension until it reaches the destination node.

Deterministic algorithms like dimension order routing can be implemented using combinatorial logic at each router. Routing algorithms can also be implemented using look-up tables at the source node or at each router along the path on the network. Source routing involves the source node embedding routing information for each packet into the packet header. In its simplest form, this routing information is an ordered list of output links to take on each router along the path. The routing information is updated at each node to shift out the information corresponding to the current hop. A distributed approach to table based routing is using lookup tables at each hop in the network. These tables store the outgoing link information for each destination through the router. Table based implementation of routing algorithms offer additional flexibility and is more suited to dynamic routing.

An interconnect may contain multiple physical networks. Over each physical network, there may exist multiple virtual networks, wherein different message types are transmitted over different virtual networks. Virtual channels provide logical links over the physical channels connecting two ports. Each virtual channel can have an independently allocated and flow controlled flit buffer in the network nodes. In any given clock cycle, only one virtual channel can transmit data on the physical channel.

NoC interconnects often employ wormhole routing, wherein, a large message or packet is broken into small pieces called flits (also called flow control digits). The first flit is the header flit which holds information about this packet's route and key message level info along with some payload data and sets up the routing behavior for all subsequent flits associated with the message. Zero or more body flits follows the head flit, containing the remaining payload of data. The final flit is tail flit which in addition to containing the last payload also performs some book keeping to close the connection for the message. In wormhole flow control, virtual channels are often implemented.

The term "wormhole" refers to the way messages are transmitted over the channels: When the head of a packet arrives at an input, the destination can be determined before the full message arrives. This allows the router to quickly set up the route upon arrival of the head flit and then transparently forward the remaining body flits of the packet. Since a message is transmitted flit by flit, it may occupy several flit buffers along its path at different routers, creating a worm-like image.

Mesh topology for NoC is well suited to silicon implementation because of the inherent 2D structure of the topology which maps well to planar semiconductor processes. Traditional 2D mesh topology assumes a regular and symmetric layout with uniformly sized blocks. However in practice, blocks on a chip can vary widely in shape and dimensions. Further, the blocks may have restrictions on allowing interconnect infrastructure amidst its internal logic and wires. An example would be a large hard macro or embedded memory, with all metal layers occupied, thus disallowing any interconnect related logic or links to pass through it. These restrictions mean that interconnect wires on practical chips cannot be as regular and structured as a 2D-mesh topology. Heterogeneous cores of such systems would need a modified mesh topology with an irregular or asymmetric structure to interconnect them. Further, depending on the communication pattern within the system, additional redundant links and routers from a full 2D mesh can be removed. Such customized topologies will often be more power efficient than standard topologies.

From the above paragraph it is clear that physical layout or floor plan of a modern chip heavily influences the layout of the wires and components (e.g., routers) making up the system interconnect. Traditional methodology considers the system interconnect as just another subsystem of the chip developed using standard register transfer level (RTL) design and backend flow. This approach can create significant problems during the chip's physical design phase. The system interconnect can place large demands on metal/wiring resources and routing channels on the die. Further, ad hoc layout of the interconnect can cause wiring congestions on the die and can aggravate cross-talk and SI related issues. Routing around blockages can result in unpredictable inter-router wire lengths causing timing paths within the interconnect to show large negative slacks in top level timing.

SUMMARY

The present inventive concept provides "physical design aware" customized sparse mesh topologies made up of irregular sized grids to interconnect non-homogenous cores on a chip. An exemplary technique for synthesizing the custom topology along with routing and deadlock avoidance in such interconnects is also provided.

BRIEF DESCRIPTION OF THE DRAWINGS

FIG. 13 illustrates flow for synthesizing floor plan aware customized asymmetric mesh topology NoC interconnects.

DETAILED DESCRIPTION

Figure 3:
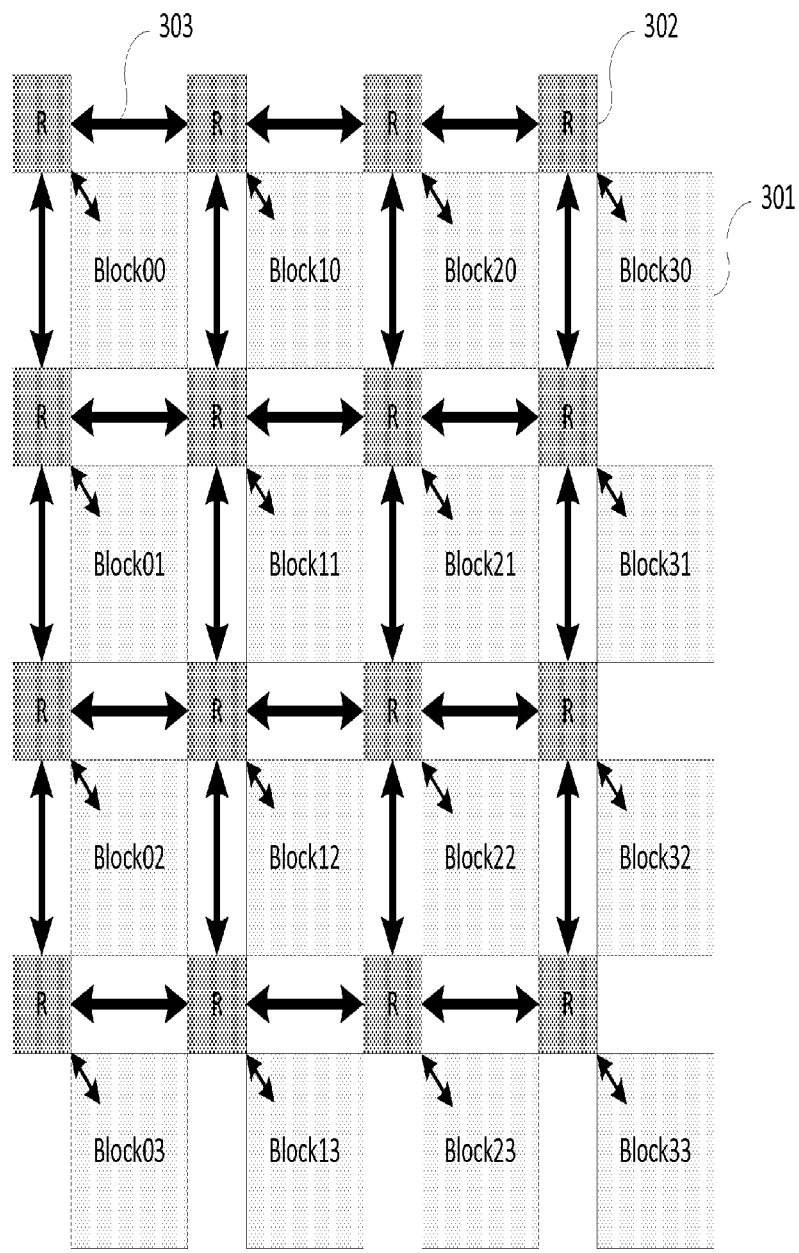
FIG. 3 illustrates an example of homogenous cores connected by a full mesh topology.
Figure 4:
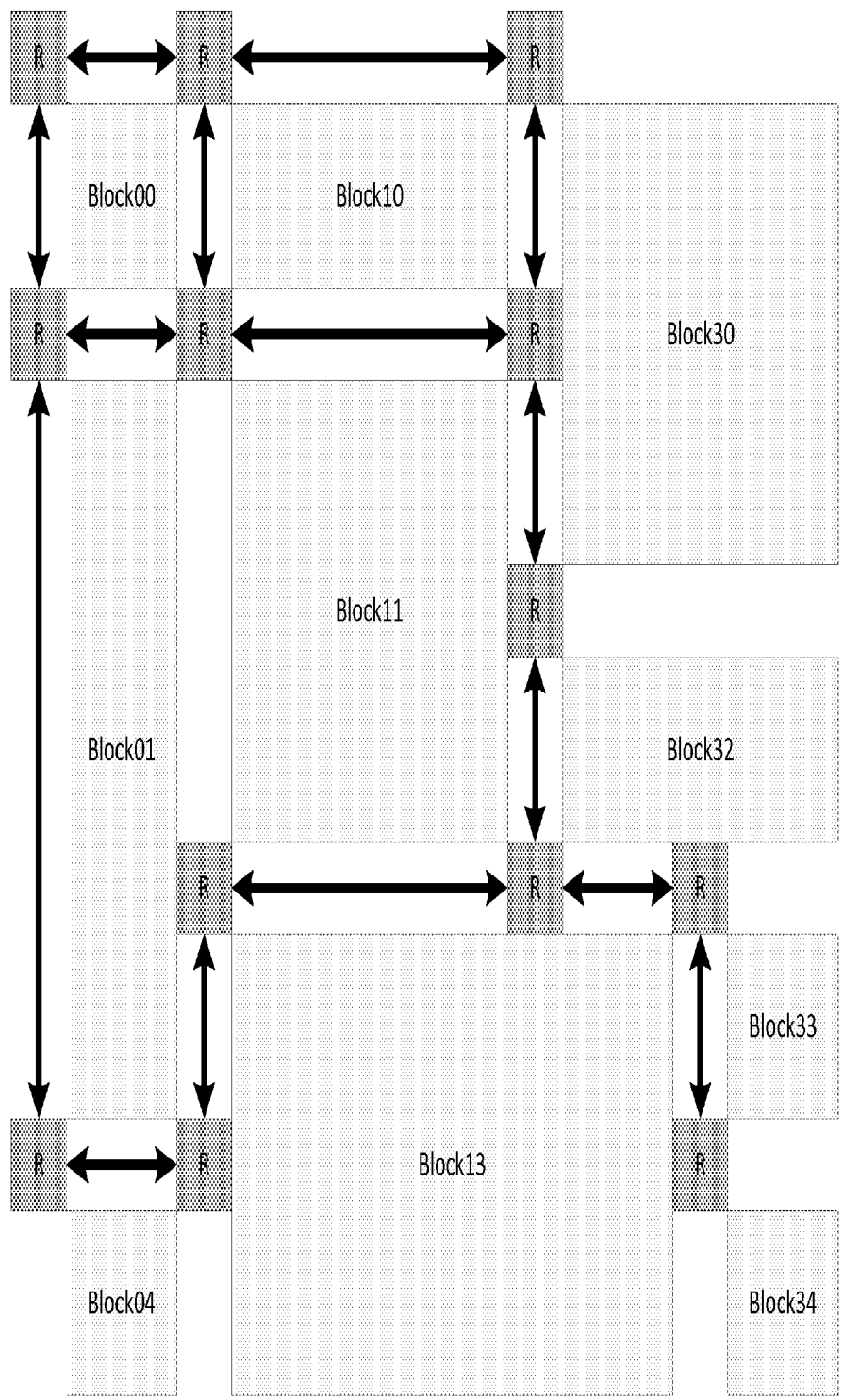
FIG. 4 illustrates heterogeneous cores interconnected by a customized sparse mesh topology.

FIG. 3 illustrates an example of uniform (e.g., homogeneous) cores 301 connected by a full regular mesh topology consisting of routers 302 and physical links 303. Contrast this to FIG. 4 which illustrates blocks of heterogeneous size and shapes interconnected using a customized mesh topology. The customized mesh is adapted from a full mesh by selectively removing one or more routers and/or one or more links from a full mesh, to produce a resultant sparsely populated mesh. This derivative mesh topology with an irregular structure will be referred to herein as a "sparse mesh".

An option for interconnecting heterogeneous blocks is to use a network of routers in an ad hoc topology. Such a topology would need each router to be fully identified by a network ID and routing algorithm over the network would have to be fully flexible, requiring complex source routing or distributed table based routing. Compared to this approach, the present inventive concept uses a regular mesh as the underlying topology for synthesizing a custom topology.

Figure 5:
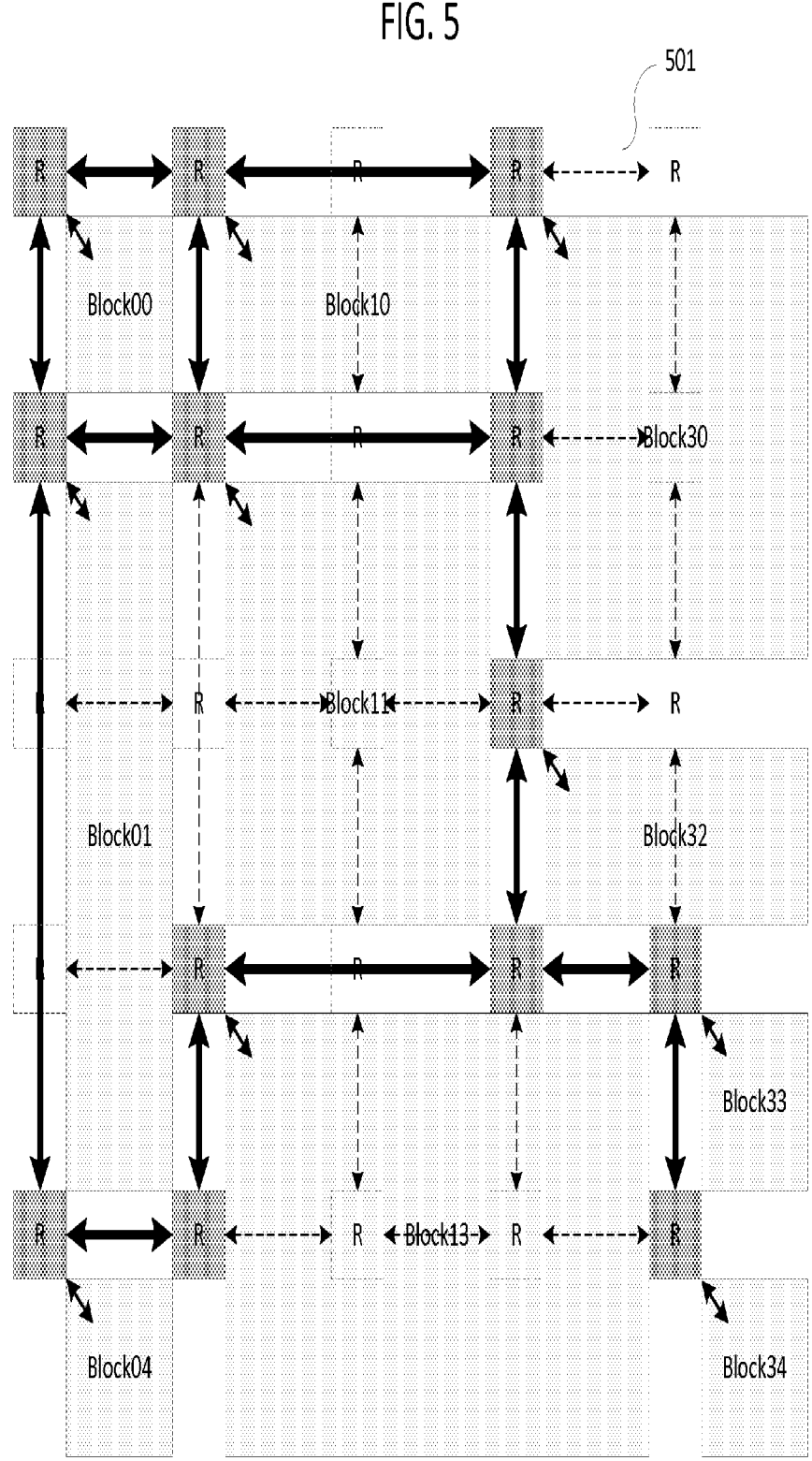
FIG. 5 illustrates the interconnect of system in FIG. 4 as a subset of the full reference mesh.

As illustrated in FIG. 5 by the dotted lines 501, a sparse mesh can be considered a subset of a full mesh. It is similar to a full mesh in terms of the addresses of blocks interconnected on the NoC, i.e., the blocks are still identified by their XY co-ordinate on the mesh grid. However, some routers and links are removed to allow blocks of different sizes and shapes to occupy different number of grid spaces on the original mesh grid. An algorithm for synthesizing a custom topology starting from a full mesh is simpler in comparison to an algorithm required to generate a fully ad hoc interconnect topology. Further, compared to routing in an ad hoc topology, a sparse mesh topology has simpler network addressing and this allows the routing algorithm to be simpler hence more area and power efficient.

Figure 1A:
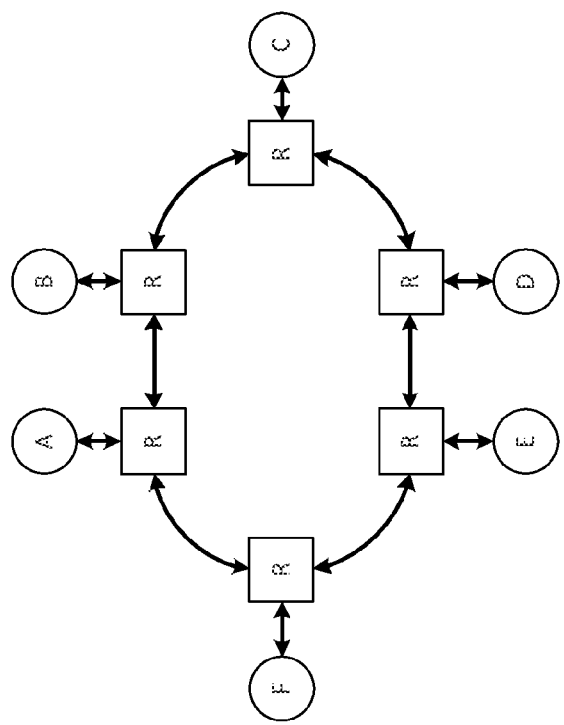
FIG. 1(a) and FIG. 1(b) illustrate Bidirectional Ring and Mesh NoC Topologies.
Figure 1B:
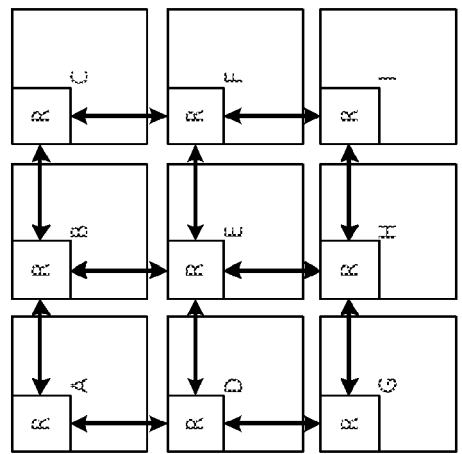
Figure 2:
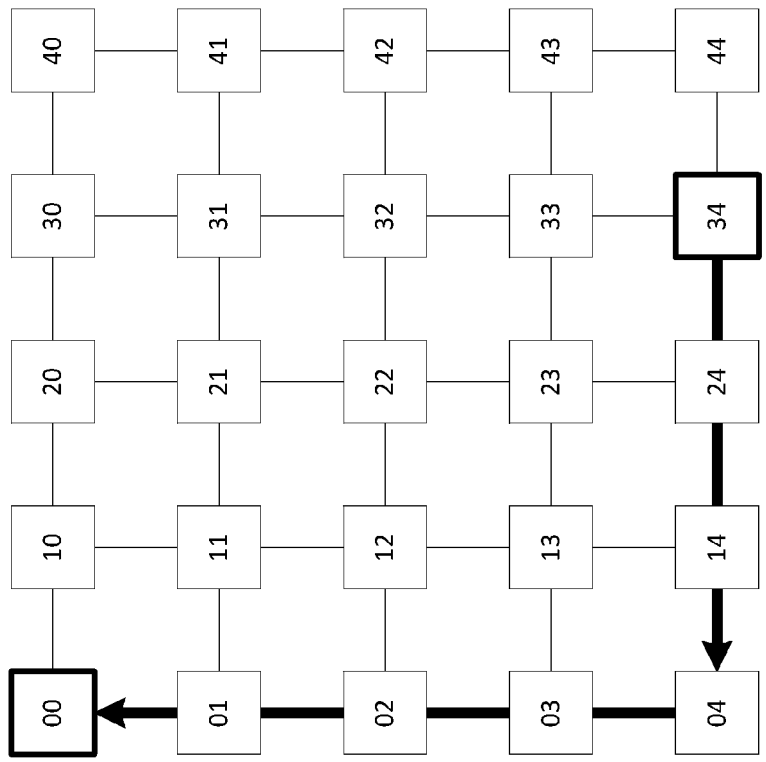
FIG. 2 illustrates an example of XY routing in a two dimensional mesh.

As illustrated in FIG. 2, dimensional order routing in traditional mesh interconnects is a low cost, shortest path, static routing option which also ensures that network level deadlocks due to routing are avoided. However, in sparse meshes, because some routers and links are missing, simple dimension-order XY/YX routing cannot be used. Any routing technique employed has to be able to route around blockages and dead ends.

Typically, irregular topologies use distributed routing in the form of routing tables or use source routing. Both these techniques have performance, area and power costs associated with it and are not optimal for on chip networks. The present inventive concept provides a static routing technique which combines aspects of source routing and per-router fixed routing logic to achieve optimal cost routing in sparse mesh networks.

The present inventive concept gathers relevant physical information about the blocks of a chip and its layout to factor that information into micro-architecture and structure of the chip's NoC interconnect. This makes the generated interconnect conducive to easier physical layout and timing closure of the chip. X and Y physical dimensions of the chip and of all blocks on the chip and relative placement information for these blocks on the die is provided as input.

In addition to actual physical placement restrictions and requirements, high level floor plan is based on several system specifications, for example, but not limited to, intercommunication graphs, inter-block bandwidth and latency requirements, etc. For example, keeping blocks that communicate with each other using large communication bandwidth in close proximity would increase performance as well as reduce the number of sections of interconnect with high bandwidth links. Thus, logical placement of the blocks is guided by multiple cost metrics like performance, power and overall network resource requirements. Such a floor plan can be automatically generated as part of the flow, or an external floor planning tool can provide all the physical information needed.

Additional physical information regarding the porosity of various blocks to interconnect resources can also be specified. One of ordinary skill in the art will appreciate that interconnect resources may be, for example, but not limited to, routers, links, and other interconnect wires. For example, some blocks might allow channels for interconnect wires, some might allow both interconnect wires and routers, some blocks might allow wiring along either X or Y directions etc.

A host block attaches to the NoC interconnect using ports which it uses to send and receive messages to and from other blocks over the NoC interconnect. Each block may require one or more of these host ports. Physical location of these host ports on the physical foot print of the blocks is another essential information that can be conveyed through the chip floorplan.

Figure 6:
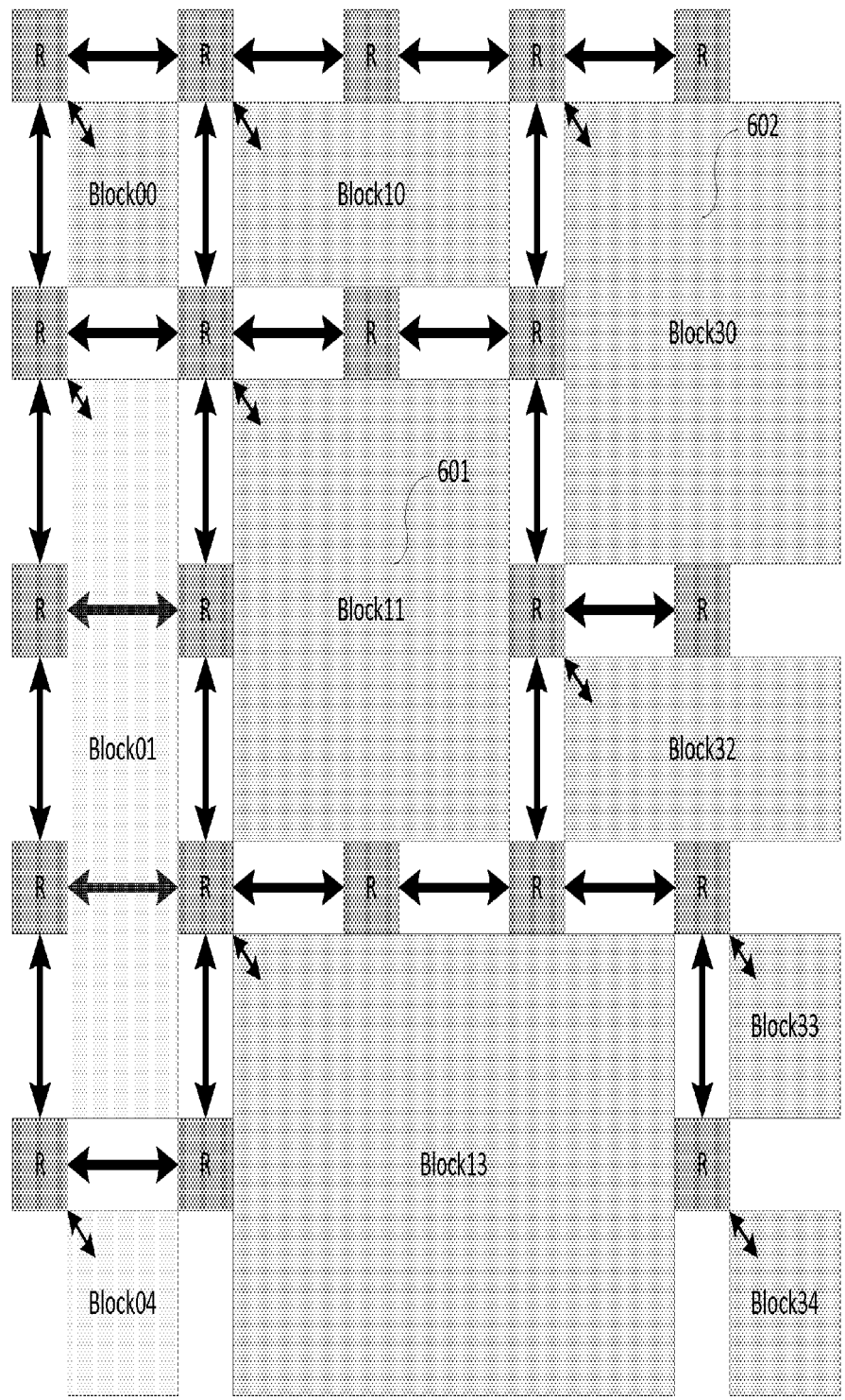
FIG. 6 illustrates a logical floor plan of heterogeneous cores overlaid on a full reference mesh. Blocked routers and links are shown.
Figure 7:
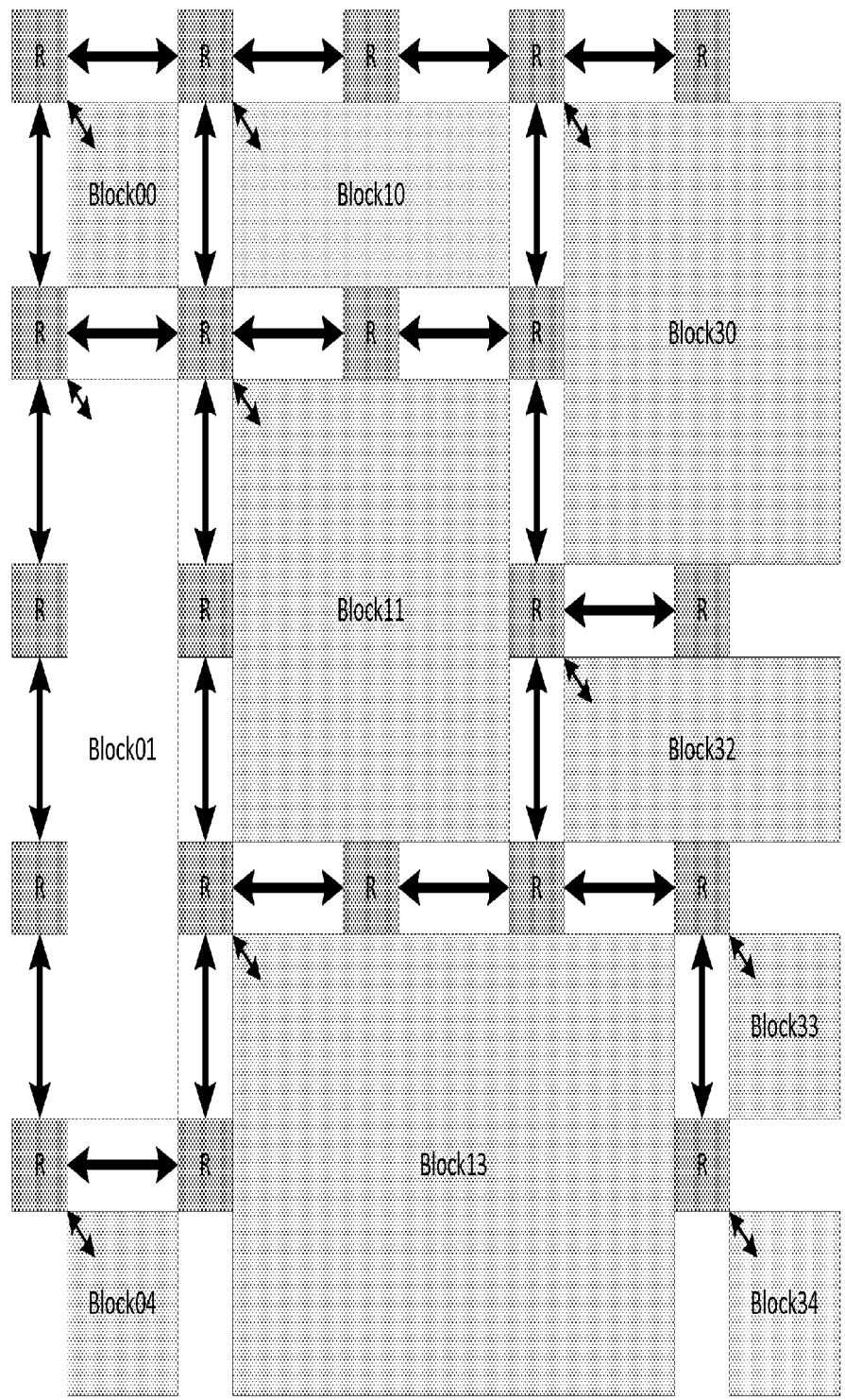
FIG. 7 illustrates a logical floor plan of heterogeneous system with blocked router and links removed.

Based on the provided physical dimensions and total number of host ports required, the presented inventive concept first computes a full 2D mesh reference grid with appropriate X and Y dimensions that would be needed for the interconnect. As shown in FIG. 6, a guidance floor plan of the chip is then placed on the reference grid and host ports of blocks are attached to the grid at available connection points. After placement of the blocks, depending on specified porosity of various blocks, some routers and links on the reference grid would be unusable. As an example, in FIG. 6 routers 601 and links 602 which are unusable due to blockages by the overlaid blocks are removed from the grid. As illustrated in FIG. 7, the reference grid is now left with routers and physical links over which all inter-block communication needs to occur.

FIG. 7 illustrates that each block of the chip is connected to a single specific port of a single router. However, this is not a strict requirement. Within the scope of the present inventive concept, systems are conceivable where host blocks with multiple ports connect to the NoC at multiple routers or multiple ports of the same router. It is also conceivable that multiple hosts connect to different ports of a single router. Other such configurations are possible.

Figure 8:
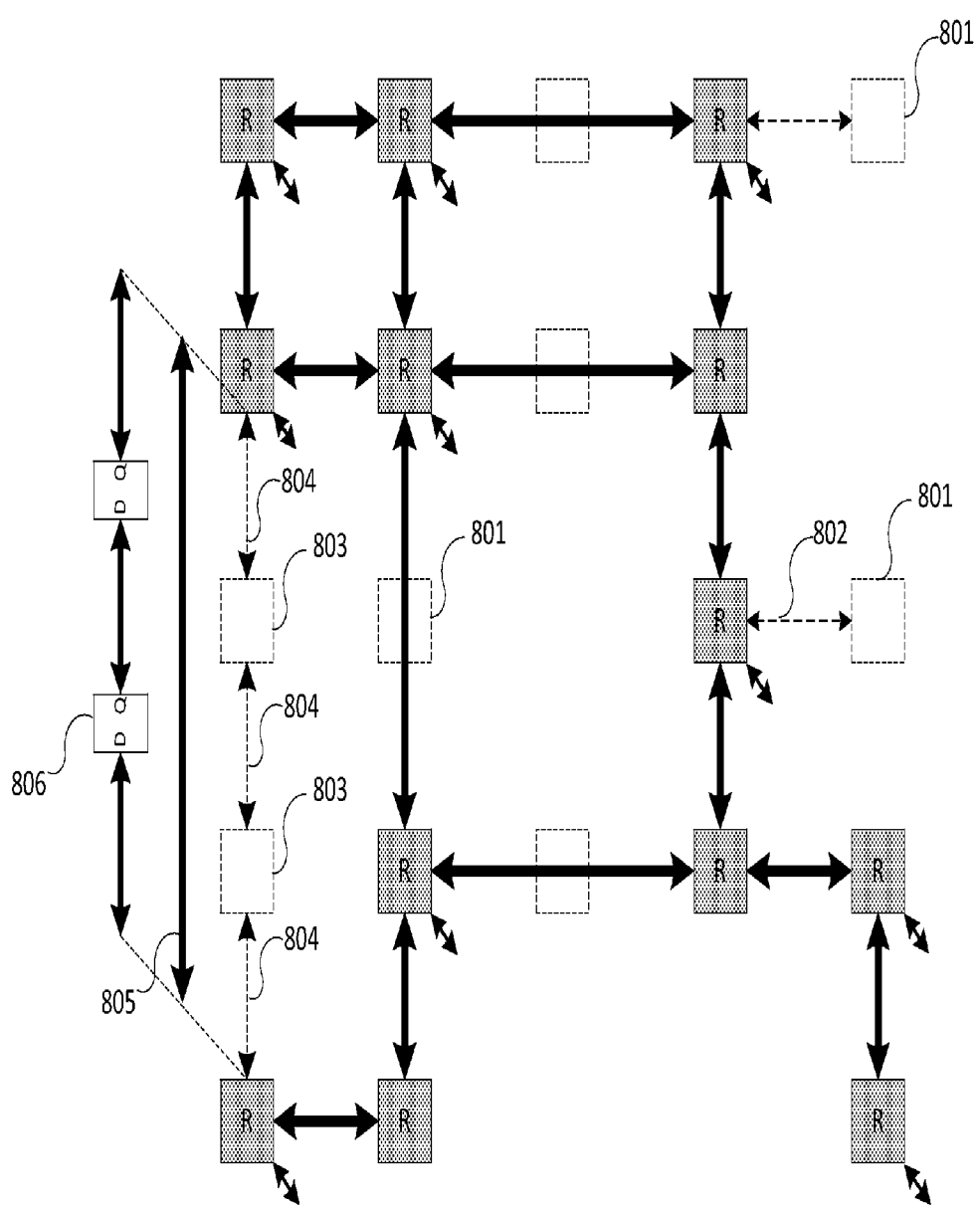
FIG. 8 illustrates redundant and unused routers and links removed from the reduced mesh.

Routers are only required at grid points where message packets might change directions on the XY plane or exit to host blocks from the NoC. In other words, routers are needed only when packets need to switch from one port to another on their path. A router is only required at points where packets from multiple input links might contend for a common output link. Based on these criteria, redundant routers 801 and unused links 802 to the redundant routers are removed as illustrated in FIG. 8.

When multiple redundant routers 803 are removed, multiple smaller link sections 804 of the original network can be merged into a single link 805. The merged link 805 might be too long, and resulting wire delay might cause timing issues on the path. In such cases, the unused routers on these links can instead be replaced by one or more pipeline register stages 806 as needed for accommodating timing constraints. Instead of pipeline register stages, repeater or buffer stages can also be used.

Figure 9:
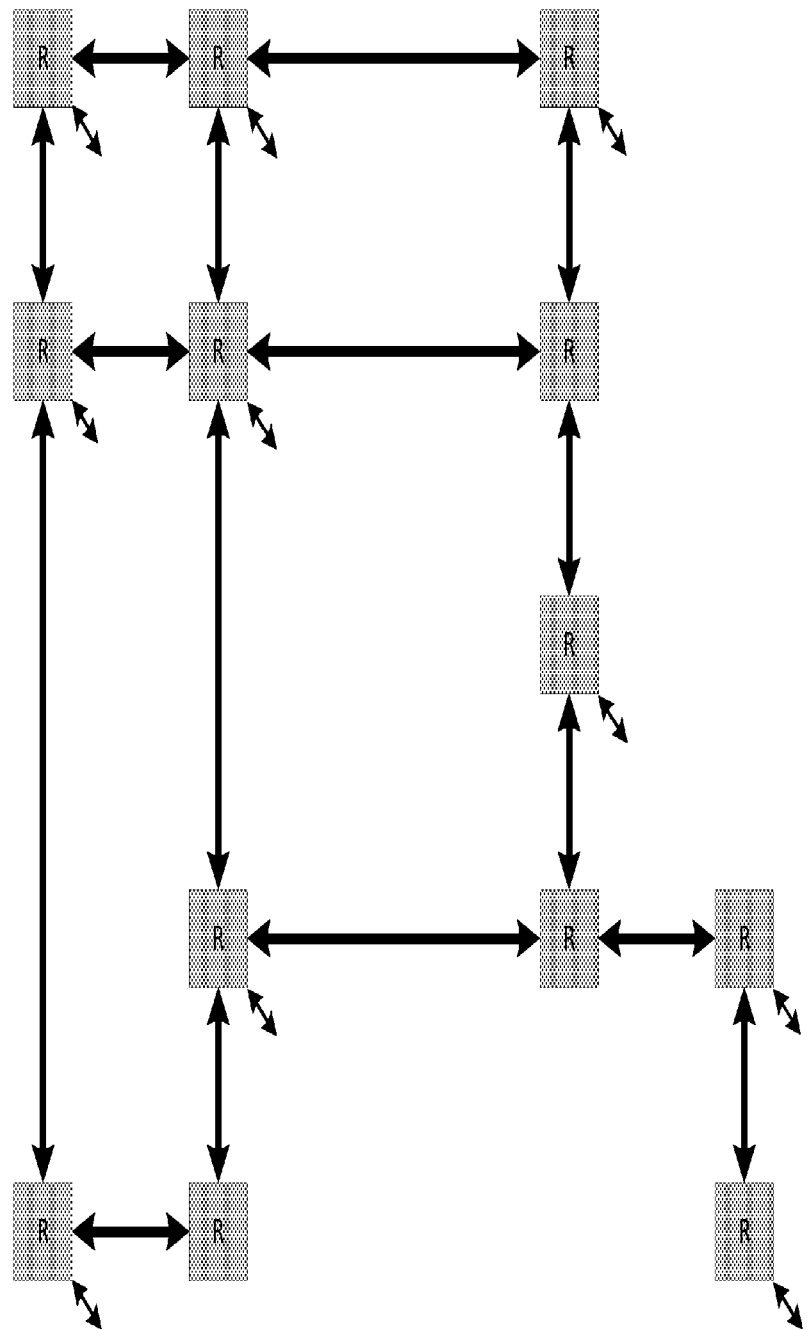
FIG. 9 illustrates a graph over which all the point-to-point communication in the system has to be mapped.

Since dimensional ordered XY/YX routing cannot be used for all point to point routes on the reduced mesh, other static routes using available routers and physical links of the mesh are needed. From the high level specification of all inter-block communications in the system, point-to-point routes for each valid source-destination pair of nodes on the reduced mesh grid is identified. The example embodiments visualize the reduced mesh as a directed graph, with routers forming vertices of the graph and available physical links between routers forming edges of the graph, as illustrated in FIG. 9. Shortest path algorithms, for example, but not limited to, Dijkstra's algorithm, can then be used to find shortest point to point routes on the graph. This is the lowest cost path on the graph between the two end-points, where cost is defined in terms of number of hops and number of turns or other metrics. Minimizing the number of hops reduces the communication latency on the path and minimizing the number of turns reduces the size of the routing information that needs to be carried with each packet.

There is a possibility of finding multiple paths between two given end points and paths have to be chosen to balance performance and overall cost of the interconnect. While adding new communications, preference could be given to the reuse of paths which already exist in the network. This criterion tends to minimize the amount of resources needed to construct the system interconnect. A complementary criterion could be to choose a non-exiting path to achieve good load balancing across available path diversity in the network for concurrent traffic.

Inter-block routes can also be defined to create logical topologies such as trees or rings on the physical reduced mesh NoC. These logical topologies might be dictated by application requirements such as transaction or messages ordering.

Once physical paths are identified for communication between all valid pairs of end points on the interconnect, the exact technique for routing packets over these paths needs to be identified. The example embodiment uses a combination of source routing and low cost forwarding logic at each router along the path. At the network interface bridge of the router of each host block, a table is used to lookup the routing path to each destination node to which the host block communicates. The routing information is then embedded in the header of each packet to the destination. Along the route path, the information might be modified before the packet is delivered to the final destination.

Figure 10:
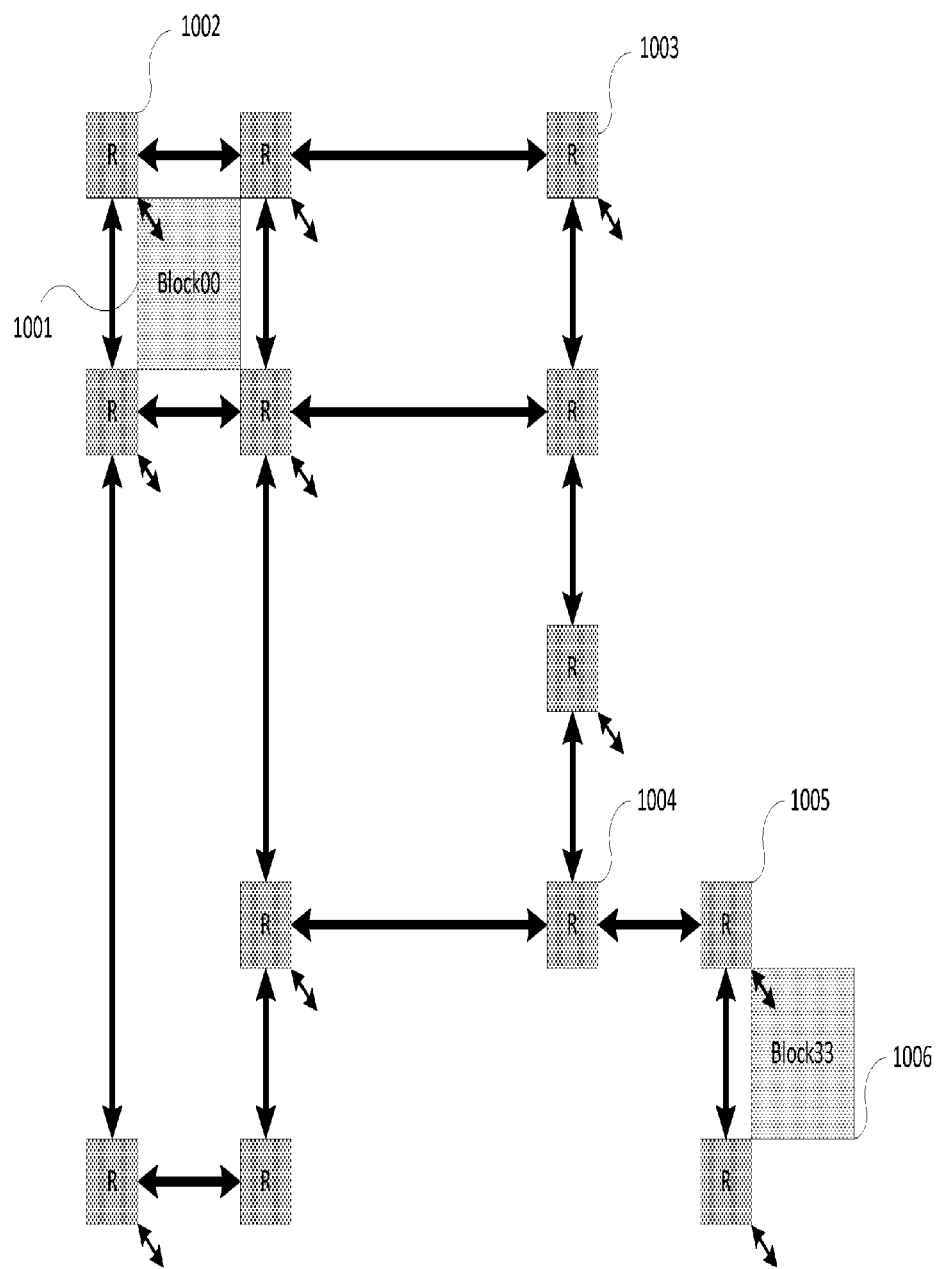
FIG. 10 illustrates an example multi-turn route on the interconnect.

The example embodiment restricts the number of turns allowed on a path to two in order to keep the size of routing information optimal. One of ordinary skill in the art will recognize that other variations are possible and are encompassed by the present inventive concept. FIG. 10 illustrates an example of multi-turn route on a sparse mesh interconnecting heterogeneous blocks. Route for a message is fully specified by:

1. Its output port on the first router (the router to which the source host block is connected)
2. Routers on which it takes a 90 degree turn
3. The last router (the router to which the destination host block is connected) and
4. The output port on the last router through which the message exits the network to the destination host.

Referring to FIG. 10, element 1001 is the source block, element 1002 is the first router, element 1003 is the first turn, element 1004 is the second turn, element 1005 is the last router on the path and element 1006 is the destination block. The format of route information carried in the header of packets from the source block 1001 is:

[first turn] [second turn] [last router] [last router: exit port]

Figure 11:
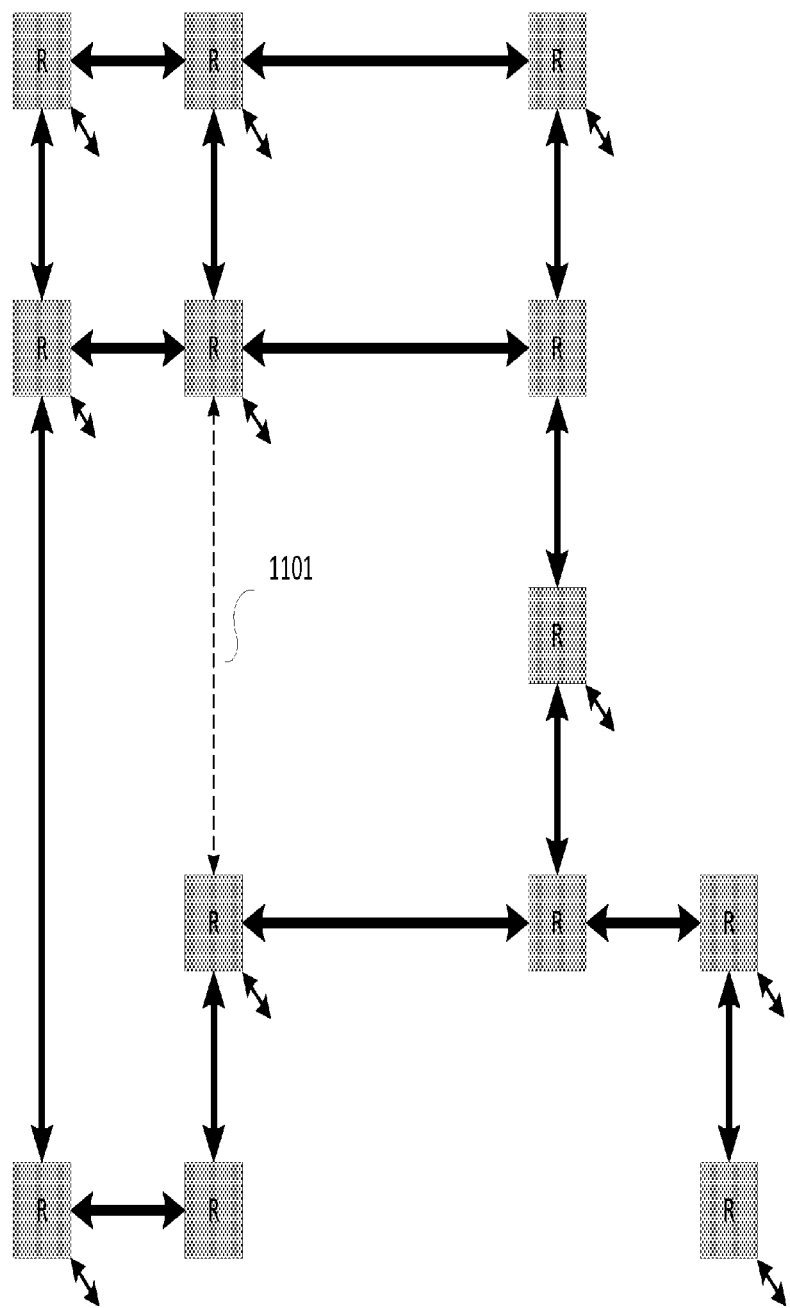
FIG. 11 illustrates an unused physical link removed from the interconnect.

Once routing paths for all valid point-to-point communication between source-destination pairs of nodes on the system are mapped to the available physical channels, there could still be physical channels on the network which are completely unused. These channels can also be removed to create the final sparse mesh interconnect topology. This is illustrated in FIG. 11, where element 1101 is a physical link of the network which remains unused after all valid traffic in the system has been assigned routes. This link is removed from the network.

A complex and fully customized set of routing paths are identified for intercommunication on a sparse mesh topology. This introduces a possibility of fundamental network level deadlocks in the interconnect. Hence, the example embodiment next applies the deadlock avoidance technique as disclosed in U.S. patent application Ser. No. 13/599,559, the disclosure of which is incorporated herein in its entirety by reference, to map each communication sequence in the design based on the point-to-point physical paths identified in earlier steps. Virtual channels are suitably selected on the physical links of the network such that the entire communication pattern in the system is free of cyclic channel dependencies and hence is free of deadlocks.

Figure 12:
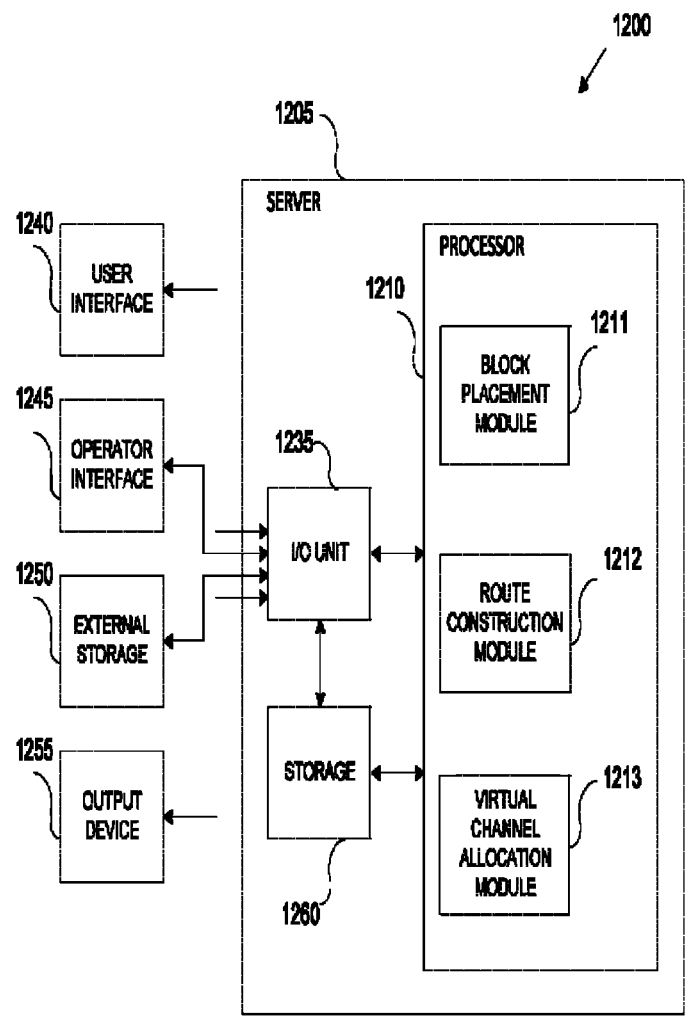
FIG. 12 illustrates an example computer system on which example embodiments may be implemented.

FIG. 12 illustrates an example computer system on which example embodiments may be implemented to construct customized sparse mesh topologies for interconnecting heterogeneous blocks. This example system is merely illustrative and other module or functional partitioning may be substituted therefore as would be understood by those skilled in the art. Further, this system may be modified, by adding, deleting or modifying modules and operations, without departing from the scope of the inventive concept.

The computer system 1200 includes a server 1205 which may involve an I/O unit 1235, storage 1260, and a processor 1210 operable to execute one or more units as known to one of skill in the art. The term "computer-readable medium" as used herein refers to any medium that participates in providing instructions to processor 1210 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1240 and operator interfaces 1045 which may utilize input devices such as a keyboard, mouse, touch device, or verbal command.

The server 1205 may also be connected to an external storage 1250, which can contain removable storage such as a portable hard drive, optical media (CD or DVD), disk media or any other medium from which a computer can read executable code. The server may also be connected an output device 1255, such as a display to output data and other information to a user, as well as request additional information from a user. The connections from the server 1205 to the user interface 1240, the operator interface 1245, the external storage 1250, and the output device 1255 may via wireless protocols, such as the 802.11 standards, Bluetooth® or cellular protocols, or via physical transmission media, such as cables or fiber optics. The output device 1255 may therefore further act as an input device for interacting with a user.

The processor 1210 may execute one or more modules and the modules executed by the processor may communicate with one another. The block placement module 1211 may be configured to compute a reference grid and place blocks on the reference grid based on their physical dimensions, relative placement information, and host port requirement. The route construction module 1212 may be configured to determine and remove unusable and/or redundant ones of the plurality of routers and associated physical links and map inter-block communication over the remaining ones of the plurality of routers and physical links of the interconnect for routing messages between blocks. The virtual channel allocation module 1213 may be configured to select available virtual channels for a link in the route between endpoints of a section in the remaining ones of the physical channels such that the entire communication pattern in the system is free of cyclic channel dependencies.

FIG. 13 illustrates an example process of the present application. This example process is merely illustrative, and other processes may be substituted therefore as would be understood by those skilled in the art. Further, this process may be modified, by adding, deleting or modifying operations, without departing from the scope of the inventive concept.

In 1301, relevant physical information is gathered or obtained. For example but not by way of limitation, such physical information may include, but is not limited to, dimensions of the chip, dimensions of one or more blocks, a guidance floor plan, and information on porosity of one or more of the blocks. At 1302, information is gathered or obtained regarding a number of host ports that are necessary for each block. Further, at 1303, a size of a full 2-D mesh reference grid is computed. This computation may be performed by a computing process as would be understood by one of ordinary skill in the art.

At 1305, host ports of each of the blocks are attached to the corresponding connection points that are available on the grid. Further, at 1306, the porosity information obtained in 1301 is applied to remove one or more routers and links from the reference grid that are blocked. Accordingly, at 1307, redundant routers are removed from the reference grid, and at 1308, links are merged and pipeline stages are added as required to fall within the conditions of the timing requirement.

At 1309, the reduced mesh generated by the foregoing operations is considered with respect to computation of routes for one or more source-destination pairs. At 1310, a determination is made as to whether physical paths have been identified for all of the inter-block communication for the system. If the determination of 1310 is that the physical paths have not been completely identified, the process returns to 1309. On the other hand, once it has been determined that the physical paths have an identified for all specified inter-block communication in the system, at 1311, a process is performed to identify virtual channels on the physical links for deadlock avoidance with respect to the specified inter-block communication of the system. At 1312, a removal process is performed to remove unused routers and links, so as to create a final sparse mesh topology for the network on-chip.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

The example embodiment of the algorithm to synthesize a customized sparse mesh topology can be summarize as a merging process where, starting from a full regular mesh, routers, links and resources of the network are merged or removed based on application specification and demand.

Other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A method of interconnecting blocks on a floorplan for a Network on Chip (NoC) topology, the method comprising:
   receiving at least physical dimensions of a plurality of on chip blocks on the floorplan
   receiving physical dimensions of the floorplan and relative placement information for placing the plurality of on chip blocks on the floorplan;
   receiving porosity information for the plurality of on chip blocks on the floorplan; and
   synthesizing, using a computer, an interconnection network and a plan for a physical layout of the interconnection network for the plurality of on chip blocks on the floorplan based on the received physical dimensions and porosity information and required chip functionality,
   wherein the plurality of on chip blocks comprise on chip blocks of heterogeneous dimensions.

2. The method of claim 1, wherein ones of a plurality of routers are retained on a mesh reference grid only at locations where message packets communicated between the plurality of on chip blocks change direction and at locations where message packets exit to host blocks of the plurality of on chip blocks.

3. The method of claim 2, further comprising:
   determining dimensions of the mesh reference grid based on the physical dimensions of the floorplan, the physical dimensions of the plurality of on chip blocks, the relative placement information of the plurality of on chip blocks, and connection port requirements of a block of the plurality of on chip blocks;
   placing the plurality of on chip blocks on the mesh reference grid based on the relative placement information;
   determining ones of a plurality of routers on the reference grid that are unusable based on the porosity information for the plurality of on chip blocks;
   removing the unusable ones of the plurality of routers;
   removing redundant series-connected ones of the plurality of routers and merging physical links associated with the removed redundant series-connected ones of the plurality of routers into a single physical link; and
   replacing the single physical link with one or more pipeline register stages or one or more buffer stages.

4. The method of claim 3 further comprising:
   mapping inter-block communication over the remaining ones of the plurality of routers and associated physical links to the remaining ones of the plurality of routers.

5. The method of claim 2, wherein at least one of the plurality of on chip blocks comprises multiple ports connected to one of (a) multiple routers of the plurality of routers and (b) multiple ports of the one router of the plurality of routers.

6. The method of claim 2, wherein at least one of the plurality of routers comprises multiple ports, each of the multiple ports connected to a different one of the plurality of on chip blocks.

7. A non-transitory computer readable medium storing instructions for implementing a method, the instructions comprising:
   receiving at least physical dimensions of a plurality of on chip blocks on a floorplan for a Network on Chip (NoC) topology;
   receiving physical dimensions of the floorplan and relative placement information for placing the plurality of on chip blocks on the floorplan;
   receiving porosity information for the plurality of on chip blocks; and
   synthesizing an interconnection network and a plan for a physical layout of the interconnection network for the plurality of on chip blocks on the floorplan based on the received physical dimensions and porosity information and required chip functionality, wherein the plurality of on chip blocks comprise blocks of heterogeneous dimensions.

8. The non-transitory computer readable medium storing instructions for implementing the method of claim 7, wherein ones of a plurality of routers are retained on a mesh reference grid only at locations where message packets communicated between the plurality of on chip blocks change direction and at locations where message packets exit to host blocks of the plurality of on chip blocks.

9. The non-transitory computer readable medium storing instructions for implementing a method of claim 8, wherein the instructions further comprise:
   determining dimensions of the mesh reference grid based on the physical dimensions of the floorplan, the physical dimensions of the plurality of on chip blocks, the relative placement information of the plurality of on chip blocks, and connection port requirements of a host block of the plurality of on chip blocks;
   placing the plurality of on chip blocks on the mesh reference grid based on the relative placement information;
   determining ones of a plurality of routers that are unusable based on the porosity information for the plurality of on chip blocks;
   removing the unusable ones of the plurality of routers;
   removing redundant series-connected ones of the plurality of routers and merging the physical links associated with the removed redundant series-connected ones of the plurality of routers into a single physical link; and
   replacing the single physical link with one or more pipeline register stages or one or more buffer stages.

10. The non-transitory computer readable medium storing instructions for implementing a method of claim 9, wherein the instructions further comprise:
    mapping inter-block communication over the remaining ones of the plurality of routers and associated physical links to the remaining ones of the plurality of routers.

11. The non-transitory computer readable medium storing instructions for implementing a method of claim 8, wherein at least one of the plurality of on chip blocks comprises multiple ports connected to one of (a) multiple routers of the plurality of routers and (b) multiple ports of the one router of the plurality of routers.

12. The non-transitory computer readable medium storing instructions for implementing a method of claim 8, wherein at least one of the plurality of routers comprises multiple ports, each of the multiple ports connected to a different one of the plurality of on chip blocks.

* * * * *